BUFFER MEMORY SYSTEM

Filed July 31, 1967 2 Sheets-Sheet 1

INVENTOR.
JOHN GUZAK, JR.
BY Joseph J. Grass
ATTORNEY

March 31, 1970 J. GUZAK, JR 3,504,353

BUFFER MEMORY SYSTEM

Filed July 31, 1967 2 Sheets-Sheet 2

INVENTOR.
JOHN GUZAK, JR.

BY Joseph J. Grass
ATTORNEY

United States Patent Office 3,504,353

Patented Mar. 31, 1970

3,504,353

BUFFER MEMORY SYSTEM

John Guzak, Jr., Waukegan, Ill., assignor to SCM Corporation, New York, N.Y., a corporation of New York Filed July 31, 1967, Ser. No. 657,405
Int. Cl. G11b 5/74
U.S. Cl. 340—173 12 Claims

ABSTRACT OF THE DISCLOSURE

A buffer constructed in modular form so that any desired storage capacity can be easily and economically provided. Each module of the buffer includes a read-in control device, a read-out control device, a plurality of capacitor storage devices, data inputs to and data outputs from each storage device, and two AND gates. The read-in control devices are arranged and connected to provide a first ring counter and the read-out control devices are also arranged and connected to provide a second ring counter. The read-in control devices are connected to respective storage devices so that data can be stored in successive modules during the occurrence of timng pulses; the termination of each timing pulse advances the first counter. When data is in one of the modules and the receiver is ready to accept data, data registers are set to initial condition, thereafter data is transferred on a first-in-first-out basis from the storage devices of one module to the data registers upon advancing of the second ring counter, and thereafter the receiver is signaled that data is in the data registers. One alarm is provided to indicate when a predetermined number less than the total number of modules contain stored data, and another alarm is provided to indicate when the buffer has been overrun.

This invention relates to a buffer for use in connection with communication equipment and the like.

In the handling of data which is to be used by a receiver, the source of data or data input apparatus for the receiver may be supplying data more rapidly than the receiver can accept it. For example, data may be supplied to a receiver such as a teleprinter at a faster rate than the time required to complete functions such as carriage return and/or line feed. In such event it is desirable to provide a buffer between the source of data supply and the teleprinter to temporarily store data so that data will be supplied to the receiver at a rate at which it can be accepted.

It is a feature of the invention to provide a novel buffer with a plurality of storage structures with first and second ring counters controlling the transfer of data into and out of the storage structures, wherein the ring counters are controlled by an improved gating and timing arrangement; and yet, the buffer has relatively few components and is economical to construct.

It is a feature of the invention to provide an improved buffer embodying an alarm to indicate when a predetermined number of the storage structures contain data, and another alarm to indicate when all the storage structures of the buffer contain data.

Figure 1:
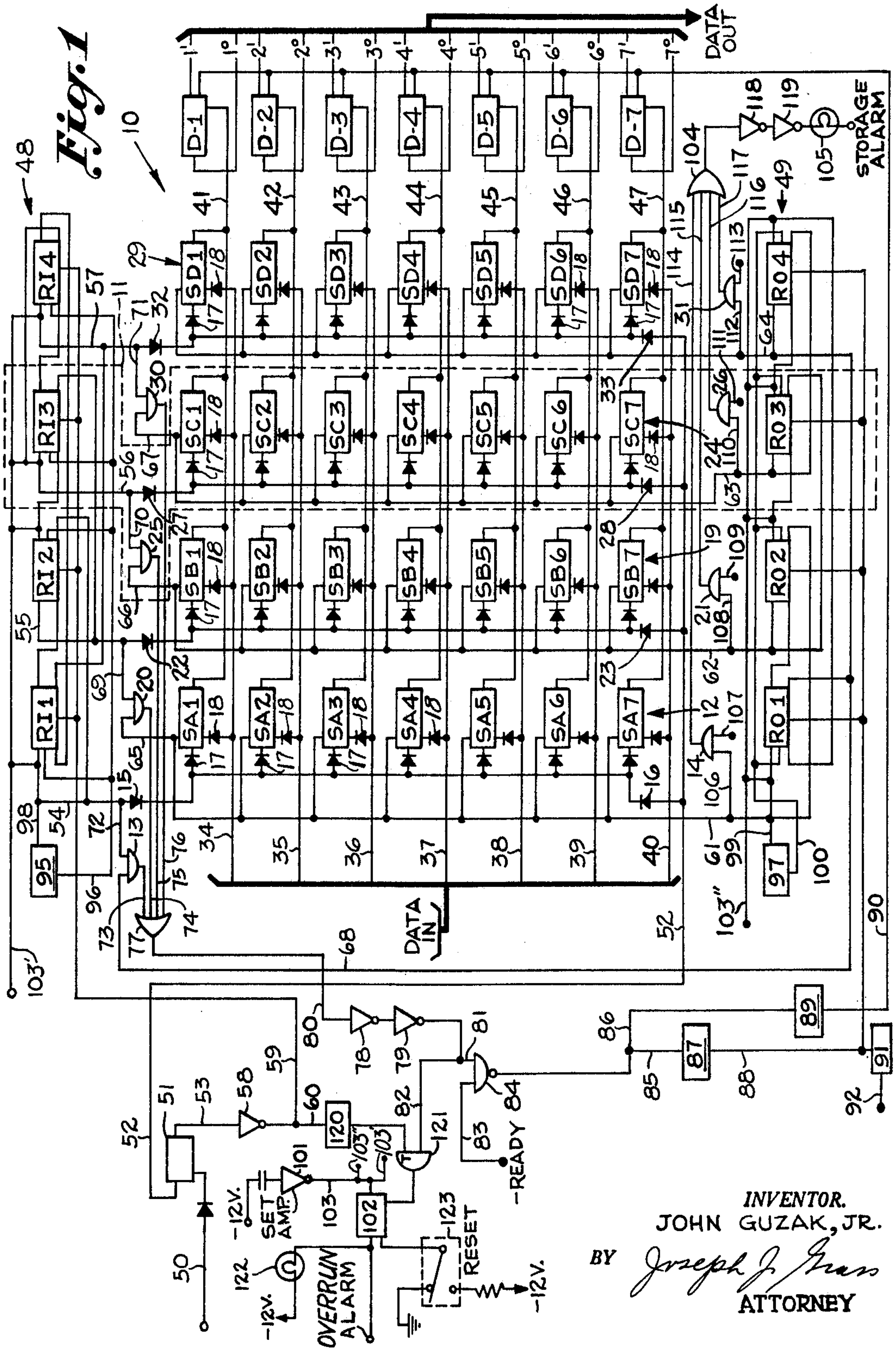
Figure 2:
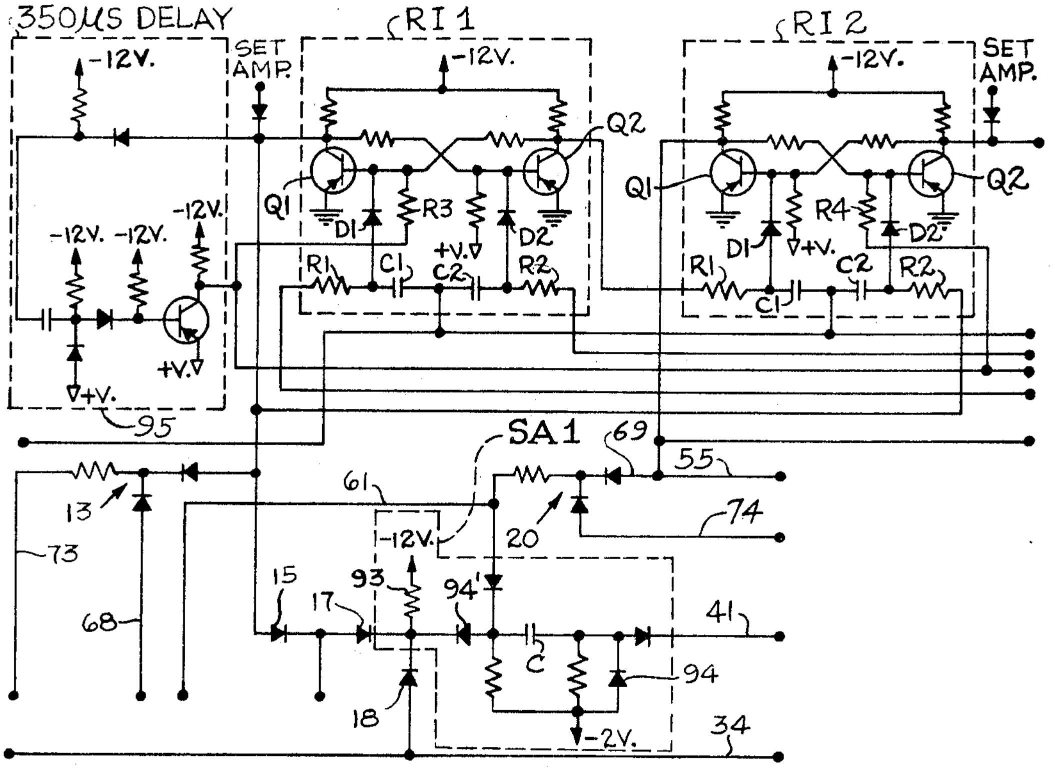
Figure 3:
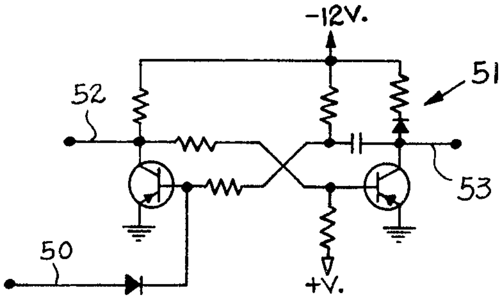

Other features will be apparent from the following description and the accompanying drawings, in which:

FIGURE 1 is a logic diagram for a buffer constructed in accordance with the invention; and FIGURES 2 and 3 are circuit diagrams for representative ones of the components shown in logic form in FIGURE 1.

Referring now to FIGURE 1 of the drawings, there is shown a buffer generally indicated at 10. The buffer 10 includes a plurality of modules, one of which is shown surrounded by a broken line 11. Each module provides storage for one code signal and has the same components as the other modules, so that not only is economy and ease of construction obtained, but buffers having lesser or greater capacities can be easily constructed without circuitry modifications. While four modules are shown, it is understood that a lesser or greater number of modules can be readily provided.

The first module includes a read-in control device RI1, a read-out control device RO1, storage structure generally indicated at 12 which includes storage devices SA1 through SA7, AND gates 13 and 14, an AND gate which includes diodes 15 and 16, and a plurality of AND gates each of which include diodes 17 and 18 associated with individual storage devices SA1 through SA7, together with electrical connections described in greater detail hereinafter. Similarly the second module includes a read-in control device RI2, a read-out control device RO2, storage structure generally indicated at 19 which includes storage devices SB1 through SB7, AND gates 20 and 21, an AND gate which includes diodes 22 and 23, and a plurality of AND gates each of which include diodes 17 and 18 associated with storage devices SB1 through SB7, together with electrical connections. The third module, surrounded by the broken line 11, includes a read-in control device RI3, a read-out control device RO3, storage structure generally indicated at 24 which includes storage devices SC1 through SC7, AND gates 25 and 26, an AND gate which includes diodes 27 and 28, and a plurality of AND gates each of which include diodes 17 and 18 associated with storage devices SC1 through SC7, together with electrical connections. The fourth module includes a read-in control device RI4, a read-out control device RO4, storage structure generally indicated at 29 which includes storage devices SD1 through SD7, AND gates 30 and 31, an AND gate which includes diodes 32 and 33, and a plurality of AND gates each of which include diodes 17 and 18 associated with storage devices SD1 through SD7, together with electrical connections.

The devices RI1 through RI4 and RO1 through RO4 have the same construction, and each takes the form of a two-state device, specifically, a bistable multivibrator. When considering the devices RI1 through RI4 and RO1 through RO4 depicted in box form in FIGURE 1 and viewing FIGURE 2, the conductor entering the box at the middle bottom is connected to the capacitors C1 and C2 of respective pedestal gates which include: the capacitor C1, a resistor R1 and a diode D1; and the capacitor C2, a resistor R2 and a diode D2. The conductor entering the box at the lower left-hand corner is connected to the resistor R1, the conductor entering the box at the lower right-hand corner is connected to the resistor R2, the conductor entering the box at the middle of the left side is connected to the resistor R3, the conductor entering the box at the middle of the right side is connected to the resistor R4, the conductor entering the box near the upper left-hand corner is connected to the collector of the transistor Q1, and the conductor entering the box near the upper right-hand corner is connected to the collector of the transistor Q2.

Each storage structure 12, 19, 24, and 29 provides a plurality of levels of data storage. Parallel bit data can be introduced to the buffer 10 on conductors 34 through 40. If the data is in binary code signal form, for example ASCII Code, data bits in the form of mark (negative potential) bits and space (ground potential) bits can be applied to the conductors 34 through 40 in various combinations. The conductor 34 is parallel connected to all of the diodes 18 associated with storage devices SA1 through SD1, conductor 35 is parallel connected to all diodes 18 associated with storage devices SA2 through SD2, and so on as indicated in FIGURE 1.

Output conductors 41 through 47 are respectively connected to each of the set for storage devices SA1, SB1, SC1, and SD1 through set SA7, SB7, SC7, and SD7. The conductors 41 through 47 lead to and are connected to data registers D1 through D7 which, for example can be bistable multivibrators. The receiver (not shown) can be connected to outputs 1' through 7' and/or to outputs 1° through 7°. Data registers D1 through D7 have one of their outputs, 1' through 7', connected from their right-hand collector terminals and have the other of their outputs, 1° through 7°, connected to their left-hand collector terminals. As a result of this arrangement, by connecting the outputs 1° through 7°, instead of the outputs 1' through 7', to the receiver, an inverted output can be supplied to the receiver.

The read-in control devices RI1 through RI4 enable data on any one or all of conductors 34 through 40 to be stored in successive storage structures 12, 19, 24, and 29. The circuit diagrams for read-in control devices RI1 and RI2 are shown in FIGURE 2. The read-in control devices RI1 through RI4 are arranged and connected to provide a four-stage ring counter generally indicated at 48. The read-out control devices RO1 through RO4 enable data in respective storage structures 12, 19, 24, and 29 to be transferred to data registers D1 through D7 via respective conductors 41 through 47. The read-out control devices RO1 through RO4 are arranged and connected to provide a four-stage ring counter generally indicated at 49.

When data is to be stored in the buffer 10, a timing pulse from the data source appearing on a conductor 50 operates a time delay 51. In the illustrated embodiment the delay 51 causes negative potential to be applied to a conductor 52 for about 4 milliseconds. This negative potential is formed by a pulse having an initiation and a termination occurring 4 milliseconds after the initiation. At the end of the 4 milliseconds, a conductor 53 connected to the delay 51 is returned to negative potential. During the time negative potential is applied to the conductor 52, all the diodes 16, 23, 28, and 33 have negative potential applied to them. As the left-hand collector of the transistor Q1 of one of the read-in control devices RI1 through RI4 is always at negative potential and as the remaining left-hand collectors of the read-in control devices RI1 through RI4 are at ground potential, only the diode 15, 22, 27, or 32 which is associated with the left-hand collector of the read-in control device which is at negative potential will be at negative potential; thus, only the storage structure 12, 19, 24, or 29 which is associated with the read-in control devices RI1, RI2, RI3, or RI4 which has its left-hand collector at negative potential can store data when a pulse is applied to the conductor 50. For example, if the diodes 22 and 23 have negative potential applied to them, the storage structure 19 can store data. Even though the diodes 16, 18, and 33 have negative potential applied to them when negative potential is applied to the diode 23, their respective diodes 15, 27, and 32 are at ground potential; hence the AND gates which include diodes 15 and 16, 27 and 28, and 32 and 33 will not be enabled. The read-in control devices RI1 through RI4 are connected to respective diodes 15, 22, 27, and 32 by conductors 54, 55, 56, and 57.

At the termination of the pulse of time delay 51, negative potential will be applied to the conductor 53. The conductor 53 is connected to an inverting amplifier 58 which in turn is connected to conductors 59 and 60. The conductor 59 is connected to all the read-in control devices RI1 through RI4 of the ring counter 48. When negative potential is applied to the conductor 53 by the termination of the pulse of the delay 51, the inverter 59 applies ground potential to the read-in control devices RI1 through RI4, thereby advancing the ring counter 48 one counter position. For example, if the left-hand collector of the read-in control device RI2 is negative, the left-hand collectors of the read-in control devices RI1, RI3, and RI4 being at ground, the negative pulse on the conductor 59 will cause the ring counter to advance so that the left-hand collector of the read-in control device RI3 will now be at negative potential and the left-hand collectors of the read-in control devices RI1, RI2, and RI4 will not be at ground potential. With the left-hand collector of the read-in control device RI3 now at negative potential, negative potential is also applied to its associated diode 27 via the conductor 56. Upon the next operation of the delay 51 in response to a timing pulse, the storage structure 24 will store data. It is apparent that the data can be stored in successive ones of the storage structures.

Even though one of the AND gates which includes didiodes 15 and 16, 22 and 23, 27 and 28, and 32 and 33, is enabled, the individual associated storage devices will store data in accordance with their respective AND gates, each of which includes one pair of diodes 17 and 18. For example, if the AND gate which includes diodes 22 and 23 is enabled and conductors 34, 36, and 38 are at ground potential and conductors 35, 37, 39, and 40 are at negative potential, only the storage devices SB2, SB4, SB6, and SB7 will be operated; that is only the capacitors C of these storage devices will be charged.

Read-out control devices RO1 through RO4 are connected to respective storage structures 12, 19, 24, and 29, and in particular to their respective storage devices SA1 through SA7, SB1 through SB7, SC1 through SC7, and SD1 through SD7, by respective conductors 61 through 64. All except one of the left-hand collectors of the read-out control devices RO1 through RO4 are always at negative potential, and the remaining one is at ground potential. The conductors 61 through 64 are connected to the one inputs 65 through 68 of respective AND gates 20, 25, 30, and 13. The conductors 55, 56, 57, and 54 are connected to the other inputs of respective AND gates 20, 25, 30, and 13. Conductors 73, 74, 75, and 76 are connected to the outputs of respective AND gates 13, 20, 25 and 30 and as the inputs to a negative OR gate 77. The output of negative OR gate 77 connects via conductor 80 to a pair of series connected inverting amplifiers 78 and 79. The output of amplifier 79 is connected to conductors 81 and 82. Conductor 81 and a "ready" line conductor 83 are connected to the input of a NAND gate 84. The "ready" line conductor 83 is connected to the receiver (not shown). When the receiver is ready to accept data from the buffer 10, the receiver places negative potential on the conductor 83. When any one of the AND gates 13, 20, 25, and 30 is enabled by negative potential being applied to both of its input conductors, which is indicative that data is being stored in one or more of the storage structures 12, 19, 24, and 29, the negative OR gate 77 will be operated because one of the conductors 73, 74, 75, and 76 had negative potential applied to it. Thus, the negative OR gate 77 applies negative potential via the conductor 80 to the series connected amplifiers 78 and 79. The resultant negative potential applied to NAND gate 84 from amplifier 79 can operate the NAND gate 84 only if the potential on "ready" line conductor 83 is also negative.

When there is no data contained in any one of the storage structures 12, 19, 24, and 29 none of the AND gates 13, 20, 25, and 30 will be enabled. If there is data in one, two, or three of the storage structures 12, 19, 24, and 29, one of these AND gates will be enabled. If all of these storage structures contain data, none of these AND gates will be enabled because the delay 51 would have returned all the read-in control devices RI1 through RI4 to positions in which the read-in control device having negative potential at its left-hand collector is one counter position advanced from the read-out control device RO1, RO2, RO3, or RO4 the left-hand collector of which is at ground potential.

Assume that data is only contained in the storage structure 19, and that the ring counter 48 has been advanced so that the left-hand collector of the read-in control device RI3 is at negative potential. Thus, negative potential is being applied to conductor 70. Assume that the left-hand collectors of the read-out control devices, except the read-out control device RO1, are all at negative potential, the counter 49 never having been advanced from its initial condition. Then negative potential is still being applied to the conductors 62 and its branch 66 leading to AND gate 25. As both the input conductors 66 and 70 associated with the AND gate 25 are at negative potential, the AND gate 25 is enabled. When the AND gate 25 is enabled, negative potential is applied to the input of the negative OR gate 77 via conductor 75. Then when negative potential is applied to the "ready" line conductors 83 and when negative OR gate 77 is enabled, the NAND gate 84 will be enabled. The circuits for enabling AND gates 13, 20, and 30 are traceable in FIGURE 1 in the same manner as for the AND gate 25.

The output of the NAND gate 84 is connected to conductors 85 and 86. Conductor 85 is connected to a 600 microsecond time delay 87 which in turn is connected to each of the read-out control devices RO1 through RO4 by a conductor 88. The other output conductor 86 from NAND gate 84 is connected to a 100 microsecond time delay 89 which in turn is operatively connected to all the data registers D1 through D7 by a conductor 90 and serves to reset all the data registers D1 through D7 to their initial states. About 500 microseconds later, the delay 87 operates the read-out control devices RO1 through RO4 to enable data in one of the storage structures 12, 19, 24, and 29 to be transferred to the data registers D1 through D7 and to advance the counter 49 one counter position. About 600 microseconds after the read-out control devices RO1 through RO4 are operated, a 600 microsecond delay 91 connected to the conductor 88 applies a pulse to an output conductor 92. The conductor 92 is connected to the receiver and serves to signal the receiver that data is in the data registers D1 through D7.

Transfer of data out of one of the storage structures is accomplished by advancing the ring counter 49. Considering the situation in which only storage structure 19 contains data, and assuming the counter 49 is in its initial condition in which the left-hand collector of the read-out control device RO1 is at ground potential and the left-hand collectors of read-out control devices RO2, RO3, and RO4 are at negative potential, when the counter 49 is advanced so that ground potential exists at the left-hand collector of the read-out control device RO2 data is transferred out of the storage structure 19.

In FIGURE 2 the read-in control devices RI1 and RI2, the 350 microsecond delay 95, AND gates 13 and 20 and the AND gate formed by diodes 17 and 18 and a resistor 93 connected to a source of negative voltage are shown in detail. The AND gate which includes diodes 17 and 18 and resistor 93 will be enabled when there is data represented by negative potential on the conductor 34, and when negative potential is applied to the diode 17. Negative potential will only be applied to the diode 17 if negative potential is applied to both diodes 15 and 16 (see FIGURE 1). Assuming the AND gate which includes diodes 15 and 16 is enabled as a result of the left-hand collector of the read-in control device RI1 being at negative potential and as a result of delay 51 simultaneously placing negative on the conductor 52, and that negative potential exists in the conductor 34, thereby enabling the AND gate which includes associated diodes 17 and 18, the capacitor C is able to charge because of a charging circuit from a negative voltage source (−2 v.), through a diode 94, the capacitor C, a diode 94', and the resistor 93 to the negative voltage source (−12 v.). The capacitor C ceases charging when the AND gate which includes the diodes 17 and 18 is disabled at the end of the 4 millisecond delay time of delay 51. As soon as a ground is applied to second storage stage conductor 62 (FIGURE 1) by read-out control device RO2, the capacitor C is re-referenced and discharges, and data in the form of a pulse is applied to conductor 41 which will set register D1.

In the illustrated embodiment, the read-in control devices RI1 through RI4 and the read-out control devices RO1 through RO4 are bistable multivibrators, each having the same basic circuit construction as appears for RI1 and RI2 in FIGURE 2. The 350 microsecond reset delay 95 is connected to each read-in control device RI1 through RI4 by a conductor 96. A reset delay 97, having the same construction as the reset delay 95, is provided for the read-out control devices RO1 through RO4. A 350 microseconds after ground potential is applied to conductors 98 and 99, respective reset delays 95 and 97 apply reset pulses to respective conductors 96 and 100, thereby resetting counters 48 and 49. The control devices RI1 through RI4 and RO1 through RO4 can also be set to initial condition by an amplifier 101. The amplifier 101 is connected to a bistable multivibrator 102 by a conductor 103. Conductors 103' and 103'' are connected to the conductor 103. The amplifier 101 serves to drive the counters 48 and 49 to their initial conditions when the buffer is first turned on. Thereafter, the reset delays 95 and 97 serve to reset the respective counters 48 and 49.

All the storage devices SA1 through SD7 have the same construction, the circuit diagram for the storage device SA1 being shown in FIGURE 2. The AND gates 14, 21, 26, and 31 connect the read-in and read-out control devices RI1 through RI4 and RO1 through RO4, respectively, in such a way that when a predetermined number of storage structures 12, 19, 24 and 29 contain data, a negative OR gate 104 is operated to in turn operate an alarm shown to take the form of a lamp 105. The one input conductor 106 to the AND gate 14 is connected to the conductor 61 which in turn is connected to the left-hand collector or the read-out control device RO1. The other input conductor 107 is connected to the conductor 57 which in turn is connected to the left-hand collector of the read-in control device RI4. The one input conductor 108 to the AND gate 21 is connected to the conductor 62 which in turn is connected to the left-hand collector of the read-out control device RO2. The other input conductor 109 is connected to the conductor 54 which in turn is connected to the left-hand collector of the read-in control device RI1. The one input conductor 110 to the AND gate 26 is connected to the conductor 63 which in turn is connected to the left-hand collector of the read-out control device RO3. The other input conductor 111 is connected to the conductor 55 which in turn is connected to the left-hand collector of the read-in control device RI2. The one input conductor 112 and the AND gate 31 is connected to the conductor 64 which in turn is connected to the left-hand collector of the read-out control device RO4. The other input conductor 113 is connected to the conductor 56 which is in turn connected to the left-hand collector of the read-in control device RI3. Output conductors 114 through 117 for respective AND gates 14, 21, 26, and 31 are connected as inputs of the negative OR gate 104. Serially connected inverting amplifiers 118 and 119 connect between the output of negative OR gate 104 and the storage alarm lamp 105.

When none of the AND gates 14, 21, 26, and 31 is enabled, the negative OR gate 104 is disabled and the lamp 105 is lit; none of these AND gates will be enabled whenever any two and only two of the storage structures 12, 19, 24, and 29 contain data. In the particular four-module embodiment illustrated, the inputs to each AND gate 14, 21, 26 and 31 are connected to one read-in control device and to the next preceding read-out control device. For example the AND gate 14 is connected to the left-hand collector of the read-in control device RI4 and to the left-hand collector of the read-out control device RO1. Assuming an initial condition wherein the left-hand collector of the read-in control device RI2 is at negative potential, the other left-hand collectors of the read-in counter 48 being at ground potential, and wherein the left-hand collector of the read-out control device RO1 is at ground potential, the other left-hand collectors of the read-out counter 49 being at negative potential, the storage of data in storage structure 19 followed by advance of the read-in counter 48 one counter position will result in the negative potential existing at the left-hand collector of the read-in control device RI3. Assuming that the data in storage structure 19 is not read out for example because the receiver is not ready to accept data, indicated by the "ready" line conductor 83 being at ground potential, read-out counter 49 will not be advanced. When the next data is received by the buffer 10, it will be stored in the third module storage structure 24 and read-in counter 48 will be advanced with the result that the negative potential will exist at the read-in control device RI4. At this stage of operation two storage structures 19 and 24 contain data, and all the AND gates 14, 21, 26, and 31 are disabled, thereby disabling the negative OR gate 104 and lighting the lamp 105.

When all the storage registers contain data, the buffer 10 is considered to be in the overrun condition. When the ring counter 48 has been advanced, as a result of read-in operations during each of which data is stored in one of the storage structures 12, 19, 24, and 29, relative to the ring counter 49 so that the negative at the left-hand collector of a certain read-in control device is one counter position advanced from the read-out control device whose left-hand collector is at ground potential, then the counters 48 and 49 correspond to an empty condition in which none of the storage structures 12, 19, 24, or 29 contain data; in this condition none of the AND gates 13, 20, 25, or 30 is enabled. Consequently, after the fourth character was read into one of the storage structures, in fact about 300 microseconds after the conductors 59 and 60 are pulsed via time delay 51, a 300 microsecond time delay 120 will trigger a pedestal gate 121. The pedestal gate can be triggered because none of the AND gates 13, 20, 25, and 30 are enabled, hence the negative OR gate 77 has not been enabled, and the input conductor 82 to the pedestal gate 121 remains at ground potential. Triggering of pedestal gate 121 causes operation of the bistable multivibrator 102 which will cause the alarm device in the form of a lamp 122 to be lit, thereby signalling the overrun condition. Lamp 122 can be turned off by operating a reset switch 123. When the storage structures 12, 19, 24, and 29 do not all contain data pedestal gate 121 can not be triggered because the conductor 82 will be at negative potential via a circuit through the negative OR gate 77.

In considering the operation of the buffer 10, when the power to the buffer 10 is turned on, the amplifier 101 sets the read-in ring counter 48 to an initial condition in which the left-hand collector of the read-in control device RI2 is at negative potential and the left-hand collectors of the remaining read-in control devices RI1, RI3, and RI4 are at ground potental. The amplifier 101 also sets the read-out ring counter 49 to a condition in which the left-hand collector of the readout control device RO1 is at ground potential and the left-hand collectors of the remaining read-out control devices RO2, RO3, and RO4 are at negative potential.

Assume, for example, that mark (negative potential) bits are applied to some of the conductors 34 through 40 and that space (ground potential) bits are applied to the remaining ones of conductors 34 through 40. The conductors 34 through 40 which have negative potential applied to them will cause all of their associated diodes 18 in each storage module to have negative potential applied to them. When a timing pulse from the source of data supply is applied to the conductor 50, the time delay 51 will apply a negative potential pulse to conductor 52 causing negative potential to be applied to diodes 16, 23, 28, and 33. As the diode 22 (upper end of the second module) has negative potential applied to it as a result of the left-hand collector of the read-in control device RI2 being at negative potential, negative potential is applied to all the diodes 17 associated with storage devices SB1 through SB7. The diodes 18 associated with storage devices SB1 through SB7 and which have negative potential applied to them, in conjunction with their associated diodes 17, will enable their respective storage devices. At the end of 4 milliseconds a pulse from the delay 51 will cause the ring counter 48 to advance one counter position so that negative potential exists at the left-hand collector of the read-in control device RI3. Data can be stored in three storage structures without the buffer 10 being overrun. Additional storage will occur when the next timing pulse is applied to the delay 51, data being contained on conductors 34 through 40.

Assume that data is also stored in storage structure 24 subsequent to the foregoing described storage in storage structure 19, the alarm light 105 will become lit to indicate this condition. When data was stored in the storage structure 19, it would have been transferred to the receiver (not shown) if the receiver had been ready to accept it, as would be indicated by negative potential on the conductor 83. As soon as negative potential is applied to the conductor 83 and there is data in one of the storage structures, during which time the negative OR gate 77 will be enabled, the NAND gate 84 will be enabled. The data registers D1 through D7 will be reset by delay 89, and thereafter the ring counter 49 will be advanced one counter position so that ground potential will exist at the left-hand collector of the read-out control device RO2 and negative potential will exist on the left-hand collectors of read-out control devices RO1, RO3, and RO4. As soon as the ground potential is advanced from the left-hand collector of the read-out control device RO1 to the left-hand collector of the read-out control device RO2, the read-out control device RO2 will cause negative potential to be applied to the conductor 62, which will enable transfer of data from storage devices SB1 through SB7 to data registers D1 through D7 via conductors 41 through 47. For example, if storage devices SB1, SB2, and SB3 did not contain data, that is their capacitors C were not charged, whereas the storage devices SB4, SB5, SB6, and SB7 did contain data, that is their capacitors C were charged, application of ground potential to all the storage devices SB1 through SB4 will cause only the data registers D4, D5, D6, and D7 to change state.

The receiver is signaled, via conductor 92 and after a delay caused by time delay 91, that the data registers contain data for the receiver to receive data in registers D1 through D7. Assuming no additional data has been stored in the buffer 10 and that the receiver is ready to accept data, the NAND gate 84 will be operated again, the data registers D1 through D7 will be reset, the read-out control device RO3 will be operated to enable transfer of data out of the storage structure 24 and into data registers D1 through D7, and the receiver will receive a signal via conductor 92. The buffer 10 is now empty of data.

Each time the left-hand collector of the read-in control device RI1 changed from negative to ground potential, the reset delay 95 is operated to reset all the read-in control devices RI1 through RI4 to their initial conditions. Each time the left-hand collector of the read-out control device RO1 changes from negative to ground potential, the reset delay 97 is operated to reset all the read-out control devices RO1 through RO4 to their initial conditions.

By the modular arrangement of the buffer 10, any number of modules can be provided, although the buffer 10 shown in the drawings has four modules. If it were desired to add a module so as to provide an additional stage or level of storage another like module could be added between the second and third modules. Each module has the same components which are preferably arranged on a circuit board (not shown). Additional modules can be provided merely by providing additional circuit boards, without any need for circuit modifications.

The invention may be embodied in other specific forms without departing from the spirit or essential characteristics thereof. The present embodiment is therefore to be considered in all respects as illustrative and not restrictive, the scope of the invention being best defined by the appended claims rather than by the foregoing description, and all changes which come within the meaning and range of equivalency of the claims are therefore intended to be embraced therein.

What is claimed is:

1. In a buffer for use in communication equipment: a plurality of data storage means each of which provides a plurality of levels of data storage, data input means electrically connected to each of said storage means and adapted to be connected to a source of data supply, data output means electrically connected to each of said data storage means and including data register means, means including first ring counter means for enabling data to be stored in successive ones of said storage means, means including second ring counter means for transferring data from said storage means to said data register means, said data output means including first gating means operative when there is data in said storage means, second gating means responsive to said first gating means and to a ready signal from a receiver, means electrically connecting said second gating means with said second ring counter means and said data register means, said electrical connecting means including first time delay means responsive to operation of said second gating means for setting said data register means to initial condition and second time delay means responsive to said second gating means for thereafter advancing said second ring counter means to effect transfer of data out of one of said storage means into said data register means, and means operable after data is in said data register means for signaling the receiver that data is in said data register means.

2. In a buffer as defined in claim 1, wherein said signaling means includes third time delay means responsive to one of said first and second time delay means.

3. In a buffer as defined in claim 1, said data input enabling means including timing means cooperable with one stage at a time of said first ring counter means for enabling data input to one of said storage means at a time, and means responsive to said timing means for advancing said first ring counter means.

4. In a buffer as defined in claim 1, wherein said data input enabling means includes timing means, and third gating means operable by said first gating means and said timing means when all said storage means contain data.

5. In a buffer as defined in claim 1, each storage means including a plurality of capacitor storage devices, said data input enabling means including a plurality of third gating means and timing means, and means electrically connecting said first ring counter means and said timing means to said third gating means for enabling one of said third gating means and for thereafter advancing said first ring counter means.

6. In a buffer for use in communication equipment: a plurality of data storage means each of which provides a plurality of levels of data storage, data input means electrically connected to each of said data storage means and adapted to be connected to a source of data supply, data output means electrically connected to each of said data storage means, means including first ring counter means for enabling data to be stored in successive ones of said storage means, means including second ring counter means for providing sequential output, of data in said storage levels, from said plurality of data storage means via said output means, said first ring counter means having a plurality of stages equal in number to the number of storage means, timing means, said storage enabling means including a plurality of first diode AND gates and a plurality of second diode AND gates, each AND gate having a pair of inputs and an output, each of said first AND gates having one input connected to one stage of said first ring counter means and the other input connected to said timing means, one input of each of said second AND gates being connected to the output of its respective first AND gate and the other input of each of said second AND gates being connected to a predetermined level of data input means, each storage means including a plurality of capacitor storage devices, the output of each of said second AND gates being connected to a respective capacitor storage device, said timing means including means for producing a timed pulse, means responsive to termination of said timed pulse for effecting transfer of data from said data input means to one of said storage means at a time, and means responsive to said termination for advancing said first ring counter means.

7. In a buffer as defined in claim 6, said data output means including register means to which data is transferred, and means operative after data has been transferred to said register means for signaling a receiver that data is in said register means.

8. In a buffer for use in communication equipment: a plurality of data storage means each of which provides a plurality of levels of data storage, data input means electrically connected to each of said storage means and adapted to be connected to a source of data supply, data output means electrically connected to each of said data storage means, means including first ring counter means for enabling data to be stored in successive ones of said data storage means, said input enabling means including timing means; means including second ring counter means for enabling sequential output of data in said storage levels from said storage means via said output means; said output enabling means including first gating means operative when at least one but less than all of said storage means contains data, second gating means responsive to said first gating means and to a ready signal from a receiver for operating said second ring counter means to effect sequential output of data, means for indicating when all said storage means contain data, and third gating means operative by said first gating means and said timing means for operating said indicating means.

9. In a buffer as defined in claim 8, wherein said first gating means includes an AND gate for each respective storage means, each AND gate having one input connected to one stage of said first ring counter means and another input connected to one stage of said second ring counter means, and an OR gate having its inputs connected to the outputs of said AND gates and its output connected to said second gating means.

10. In a buffer for use in communication equipment: a plurality of data storage means providing a plurality of levels of data storage, data input means electrically connected to each of said storage means and adapted to be connected to a source of data supply, data output means electrically connected to each of said data storage means, means including first ring counter means for enabling data to be stored in successive ones of said storage means, means including second ring counter means for providing sequential output of data in said storage levels from said storage means via said output means, means for indicating when a predetermined number of said storage means contain data, said indicating means including an alarm device and gating circuits, each gating circuit having a pair of inputs, one input of each gating circuit being directly connected to one stage of said first ring counter means and the other input of each gating circuit being directly connected to one stage of said second ring counter means.

11. In a buffer as defined in claim 10, including an OR gate connected to the output of all said gating circuits and to said alarm device.

12. In a buffer for use in communication equipment: a plurality of modules each having like components enabling a buffer to be readily constructed to have a preselected capacity corresponding to the number of modules; each module having storage means including a plurality of storage devices, a read-in control device, a read-out control device, means electrically connecting said read-in control devices and said read-out control devices with said storage means, and first and second AND gates each having two inputs; said read-in control devices of said plurality of modules being connected to provide a counter, said read-out control devices of said plurality of modules being connected to provide a counter, a plurality of data input means each connected to one respective storage device in each module, a plurality of data output means each connected to one respective storage device in each module, means including said control devices of said first and second counters and said first AND gates for transferring data out of one of said storage means at a time, said data transferring means including means connecting each read-in control device of each module to the one input of its respective first AND gate and means connecting the other input of each first AND gate to the read-out control device of the next previous module so that when any data is contained in any one of said modules and when a receiver is ready to accept data said data transferring means is operative to transfer data out of said storage means of one of said modules, means controlled by said first AND gates for indicating when all the storage means contain data, one input of each second AND gate being connected to one selected read-in control device and the other input being connected to one selected read-out control device, and means controlled by said second AND gates for indicating when a predetermined number less than the total number of storage means contain data.

References Cited

UNITED STATES PATENTS

| | | | |
|---|---|---|---|
| 3,012,240 | 12/1961 | Klahn | 340—174 |
| 3,181,129 | 4/1965 | Freedman | 340—174 |

TERRELL W. FEARS, Primary Examiner

U.S. Cl. X.R.

307—238; 340—172.5, 174